(12) United States Patent
Al-Najjar

(10) Patent No.: US 9,451,404 B2
(45) Date of Patent: Sep. 20, 2016

(54) SYSTEM AND METHOD FOR DETERMINING A POSITION OF A MOBILE UNIT

(71) Applicant: Ahmad Al-Najjar, Milton Keynes (GB)

(72) Inventor: Ahmad Al-Najjar, Milton Keynes (GB)

( * ) Notice: Subject to any disclaimer, the term of this patent is extended or adjusted under 35 U.S.C. 154(b) by 0 days.

(21) Appl. No.: 14/440,284

(22) PCT Filed: Dec. 9, 2013

(86) PCT No.: PCT/GB2013/000538
§ 371 (c)(1),
(2) Date: May 1, 2015

(87) PCT Pub. No.: WO2014/091181
PCT Pub. Date: Jun. 19, 2014

(65) Prior Publication Data
US 2015/0304816 A1    Oct. 22, 2015

(30) Foreign Application Priority Data

Dec. 12, 2012    (GB) .................................. 1222376.4
Jan. 23, 2013    (GB) .................................. 1301195.2

(51) Int. Cl.
*H04W 24/00*    (2009.01)
*H04W 4/02*    (2009.01)
*G01S 5/02*    (2010.01)

(52) U.S. Cl.
CPC ............ *H04W 4/023* (2013.01); *G01S 5/0252* (2013.01)

(58) Field of Classification Search
CPC .......................... H04W 52/0216; H04W 36/30
USPC ............... 455/456.1, 456.2, 525, 456.5, 440, 455/41.2; 370/252, 208, 328; 701/526, 408
See application file for complete search history.

(56) References Cited

U.S. PATENT DOCUMENTS

| 6,990,428 B1 | 1/2006 | Kaiser et al. |
| 7,835,749 B1 | 11/2010 | Hart et al. |
| 2007/0004427 A1* | 1/2007 | Morgan .................... G01S 5/02 455/456.1 |
| 2009/0011832 A1* | 1/2009 | Rofougaran ...... H04M 1/72544 463/41 |
| 2010/0135178 A1* | 6/2010 | Aggarwal ............. G01S 5/0205 370/252 |
| 2010/0291879 A1 | 11/2010 | Konishi et al. |
| 2012/0056786 A1 | 3/2012 | Pandey et al. |

(Continued)

FOREIGN PATENT DOCUMENTS

| EP | 2045613 A1 | 4/2009 |
| WO | 2006009955 A2 | 1/2006 |

(Continued)

*Primary Examiner* — Kiet Doan
(74) *Attorney, Agent, or Firm* — King & Schickli, PLLC

(57) ABSTRACT

A system (1200) and a method (700, 800) are provided for determining the position of a mobile unit (MU) in communication with a network in an environment. A database (720) is provided with coefficients of a polynomial function representative of a relationship between received signal strength indicators (RSSIs) of network access points (APs) and physical distances (PDs) between reference points and each AP. RSSIs are obtained (725) at the MU from the APs and a physical distance is calculated (730) between the MU and each AP based on the RSSIs and the coefficients for each AP. The position of the MU is next calculated (735) based on the calculated PDs. When the environment comprises sub-regions with variable signal propagation characteristics, the method (800) determines coefficients for each sub-region and determines the sub-region in which the mobile unit is located with a fingerprint positioning method (802).

20 Claims, 10 Drawing Sheets

(56) References Cited

U.S. PATENT DOCUMENTS

2012/0077513 A1    3/2012  Rizzello et al.
2012/0119880 A1    5/2012  Ponnuswamy
2012/0294231 A1*  11/2012  Finlow-Bates ....... H04W 48/14
                                                         370/328

FOREIGN PATENT DOCUMENTS

| WO | 2011047310 A1 | 4/2011 |
|----|---------------|--------|
| WO | 2013041889 A1 | 3/2013 |

* cited by examiner

SYSTEM AND METHOD FOR DETERMINING A POSITION OF A MOBILE UNIT

This application is the national stage of PCT/GB2013/000538, which claims priority from British Patent Application Serial Numbers 1222376.4 and 1301195.2.

FIELD OF THE INVENTION

The present invention relates to a system and method for determining a mobile unit in communication with a network.

BACKGROUND OF THE INVENTION

Location-Based Services (LBS) have a growing relevance to marketing, social networking, health, business and security applications. LBS can be used to direct customers in a shopping centre to find a certain store, monitor the movements of patients in a hospital, track a package in a shipping facility, monitor the security of a building by evaluating the density of guards using WiFi® devices, or trigger an alarm when a person enters a restricted area.

Global Positioning Systems (GPS) is a widely-used and cost-effective positioning technique, but it is not available or suitable for all environments. Obstacles such as walls, ceilings tunnels and the like render GPS ineffective, and high-rise urban buildings are known to affect positioning accuracy.

Other techniques used to implement LBS include RFID and Infrared technology which exhibit limitations similar to GPS LBS. For instance, Non-Line-Of-Sight (NLOS) environments can affect the LBS performance and the above techniques and technologies typically require dedicated hardware, software and infrastructure.

WiFi® (IEEE 802.11) is a wireless network signalling technique, which can also be used for LBS and is very widely distributed in both indoor and outdoor environments. WiFi Positioning Systems (WPS) have many advantages over the above techniques and technologies in terms of accuracy, coverage and cost-effectiveness. WPS use the same equipment which establishes wireless networks, and which is configured as a positioning system without requiring additional hardware and/or firmware or network setting modifications. As a result, WPS has become an attractive proposition for LBS in both indoor and outdoor environments. Current WPS techniques rely on either geometric or non-geometric methods. In the case of a geometric method, all network Access Points (APs) involved in the calculations need to be part of the same network to which the Mobile Unit (MU) is connected, since the method relies upon data packet communications and their acknowledgement between the APs and the MU. On the contrary, in the case of a non-geometric method, not all network Access Points (APs) involved in the calculations need to be part of the same network to which the Mobile Unit (MU) is connected, and the method indeed allows use of a substantially adjacent AP that is part of a different network.

Geometric methods include triangulation, which relies upon the Angle of Arrival (AoA), and multilateration, which relies upon the Time of Arrival (ToA) or the Time Difference of Arrival (TDoA). These geometric methods suffer from low accuracy of positioning, compared to non-geometric methods, particularly in Non-Line-Of-Sight (NLOS) environments. Non-geometric methods rely upon one or more Received Signal Strength Indicators (RSSIs) and such non-geometric methods include Cell location based on Cell Identifiers (Cell ID), Fingerprinting and trilateration. The accuracy of the Cell location method is depends on the density of Access Points (APs) or cell density. Fingerprinting and trilateration are generally more accurate than the Cell location method and although fingerprinting is dynamic (and can be used in any environment), it is not ubiquitous. In contrast, trilateration is ubiquitous but not dynamic.

SUMMARY OF THE INVENTION

According to a one aspect of the present invention, there is provided a method of determining a position of a mobile unit in communication with a network that has at least three access points, the method comprising:

obtaining and storing location co-ordinates of a plurality of reference points and access points of the network;

calculating and storing a physical distance between each one of the reference points and each one of the access points based on their stored co-ordinates;

obtaining and storing access point received signal strength indicators received at each one of the reference points, wherein each of the access point received signal strength indicators provides an indication of the signal strength of a signal sent from one of the access points;

determining coefficients of a polynomial function representative of a relationship between the stored access point received signal strength indicators and the stored physical distance between the reference points and each one of the access points;

obtaining received signal strength indicators at the mobile unit from the access points;

calculating a physical distance between the mobile unit and each of the access points based on the received signal strength indicators and the coefficients for each of the access points; and calculating a position of the mobile unit based on the calculated physical distances between the mobile unit and each of the access points.

Suitably, determining coefficients includes a step of curve fitting.

Preferably, the step of curve fitting comprises processing a database storing the received signal strength indicators of the access points and the physical distances between the reference points and the access points, and outputting coefficients that are representative of a relationship between the stored received signal strength indicators and physical distances, wherein the curve is representative of the propagation of the stored access points in an offline mode.

In a preferred embodiment, the representative curve is a polynomial curve.

In an embodiment, when the network is in an environment comprising sub-regions, determining coefficients preferably comprises determining coefficients for each sub-region respectively. The method of this embodiment may comprise the further step of determining the sub-region wherein the MU is located with a fingerprint positioning method. The fingerprint positioning method may comprise the steps of finding a Nearest Neighbour using a Distance Method, and a suitable Distance Method may be City Block.

The method may further include a step of informing the mobile unit the calculated position thereof.

Suitably, the method may further include a step of sending a message to the mobile unit, wherein the message is dependent on the calculated position of the mobile unit.

When more than 3 access points are used to improve accuracy, for instance 4, the calculating of a two-dimensional position of the mobile unit may be determined by a least squares method.

Suitably, the calculating and storing a physical distance between each one of the reference points and each one of the access points is characterised by the physical distance being calculated by Pythagoras' right angle triangle theorem.

According to another aspect of the present invention there is provided a method of determining a position of a mobile unit in communication with a network that has at least three access points, the method comprising:

providing a database with coefficients of a polynomial function representative of a relationship between access point received signal strength indicators and a physical distance between reference points and each one of the access points;

obtaining received signal strength indicators at the mobile unit from the access points;

calculating a physical distance between the mobile unit and each of the access points based on the received signal strength indicators and the coefficients for each of the access points; and calculating a position of the mobile unit based on the calculated physical distances between the mobile unit and each of the access points.

Suitably, the coefficients are obtained by curve fitting.

Preferably, the curve fitting comprises processing a database storing the received signal strength indicators of the access points and the physical distances between the reference points and the access points, and outputting coefficients that are representative of a relationship between the stored received signal strength indicators and physical distances, wherein the curve is representative of the propagation of the stored access points in an offline mode.

In an embodiment, when the network is in an environment comprising sub-regions, determining coefficients preferably comprises determining coefficients for each sub-region respectively. The method of this embodiment may comprise the further step of determining the sub-region wherein the MU is located with a fingerprint positioning method. The fingerprint positioning method may comprise the steps of finding a Nearest Neighbour using a Distance Method, and a suitable Distance Method may be City Block.

The method may further include a step of informing the mobile unit the calculated position thereof.

Suitably, the method may further include a step of sending a message to the mobile unit, wherein the message is dependent on the calculated position of the mobile unit.

According to a further aspect of the present invention there is provided a system for determining a position of a mobile unit in communication with a network, the system comprising:

the mobile unit;

a plurality of access points providing radio communication links for the network; and means for storing and processing coefficients of a polynomial function representative of a relationship between access point received signal strength indicators and a physical distance between reference points in the network and each of the plurality of access points.

In an embodiment of the system, the coefficients are obtained by curve fitting.

In an embodiment of the system, the curve fitting comprises processing a database storing the received signal strength indicators of the access points and the physical distances between the reference points and the access points, and outputting coefficients that are representative of a relationship between the stored received signal strength indicators and physical distances, wherein the curve is representative of the propagation of the stored access points in an offline mode.

In an embodiment, when the network is in an environment comprising sub-regions, determining coefficients preferably comprises determining coefficients for each sub-region respectively. The method of this embodiment may comprise the further step of determining the sub-region wherein the MU is located with a fingerprint positioning method. The fingerprint positioning method may comprise the steps of finding a Nearest Neighbour using a Distance Method, and a suitable Distance Method may be City Block.

Suitably, in operation the system determines a position of the mobile unit in communication with the network by:

obtaining received signal strength indicators at the mobile unit from the access points;

calculating a physical distance between the mobile unit and each of the access points based on the received signal strength indicators and the coefficients for each of the access points; and calculating a position of the mobile unit based on the calculated physical distances between the mobile unit and each of the access points.

Preferably, in operation the system provides for informing the mobile unit the calculated position thereof.

In operation the system preferably provides for sending a message to the mobile unit, wherein the message is dependent on the calculated position of the mobile unit.

When more than 3 access points are used to improve accuracy, for instance 4, the calculating of a two-dimensional position of the mobile unit may be determined by a least squares method.

Other aspects of the present invention are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
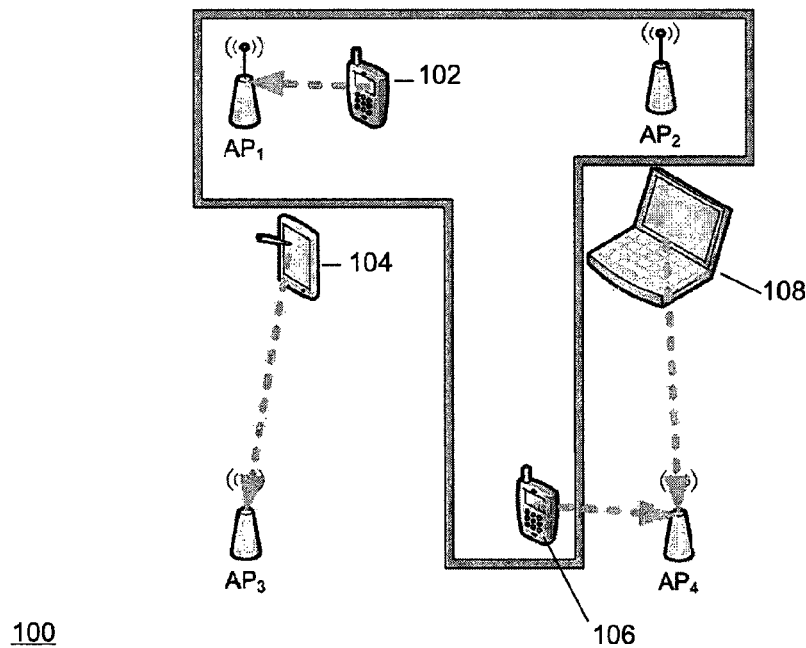
FIG. 1 is a schematic diagram of a prior art WPS that determines a Mobile Unit's MU's position by identifying its current system cell location, using a Cell ID method.

Referring to FIG. 1 there is illustrated a schematic diagram of a prior art WPS 100 that determines a Mobile Unit's MU's position by identifying its current system cell location. Cell location is the most basic method of WPS and requires a database to be created which contains the Basic Service Set (BSS) of either or both of the Service Set Identifier (SSID) or the Machine Access Control (MAC) addresses of all the available Access Points APs (or cells) along with their geographic coverage area, or location, associated with each cell. The database thus stores each available AP's BSS, consisting of the SSID first, and the MAC next if 2 APs or more have the same SSID as some network may require.

The WPS 100 determines a strongest Received Signal Strength Indicator (RSSI) indicative of signals received at each Mobile Unit (MU) 102, 104, 106 and 108. Each RSSI is dependent on the distance of a Mobile Unit (MU) from Access Points AP1 to AP4 that are transmitting signals, and the existence of obstacles such as walls or partitions, which reduce the signal strength. The location of the Access Point AP1 to AP4 that has the greatest RSSI is retrieved from the database and this location is deemed to be the location of the Mobile Unit (MU).

Figure 2:
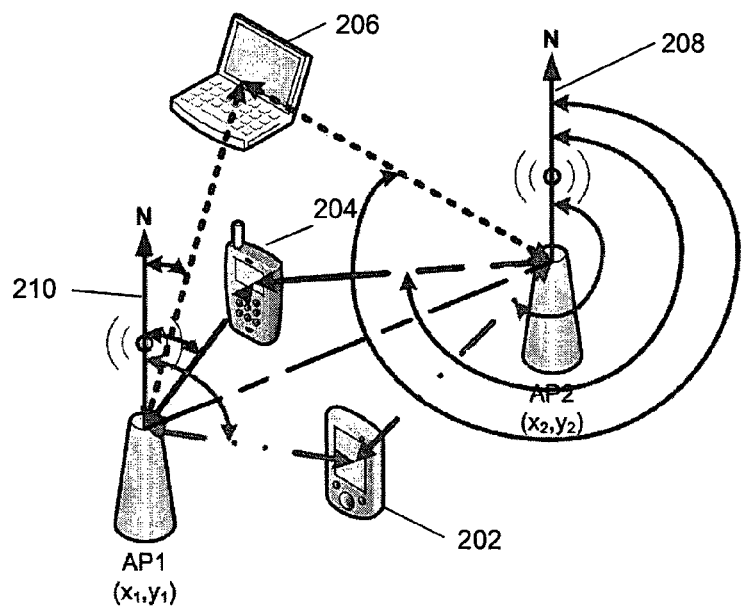
FIG. 2 is a schematic diagram of a prior art WPS that uses a triangulation method.

Referring to FIG. 2 there is illustrated a schematic diagram of a prior art WPS 200 that uses a triangulation method. The WPS 200 determines an Angle of Arrival (AoA) of a radio signal's streaming line, which is the angle between the north, being the gain of the antenna of a receiver of the Access Point (AP) 208, 210, and the line extending between the Mobile Unit (MU) 202, 204 or 206 and a respective receiver associated with an Access Point AP1 or AP2. Each Angle of Arrival AoA is determined with reference to the respective gain of the directional antennas 208, 210 and the relative power received at each Mobile Unit MU 202, 204 or 206. The co-ordinates of the Access Points AP1, AP2 and their associated Angle of Arrival AoA to the Mobile Unit MU 202, 204 or 206 are used to calculate the position of that Mobile Unit MU 202, 204 or 206.

Figure 3A:
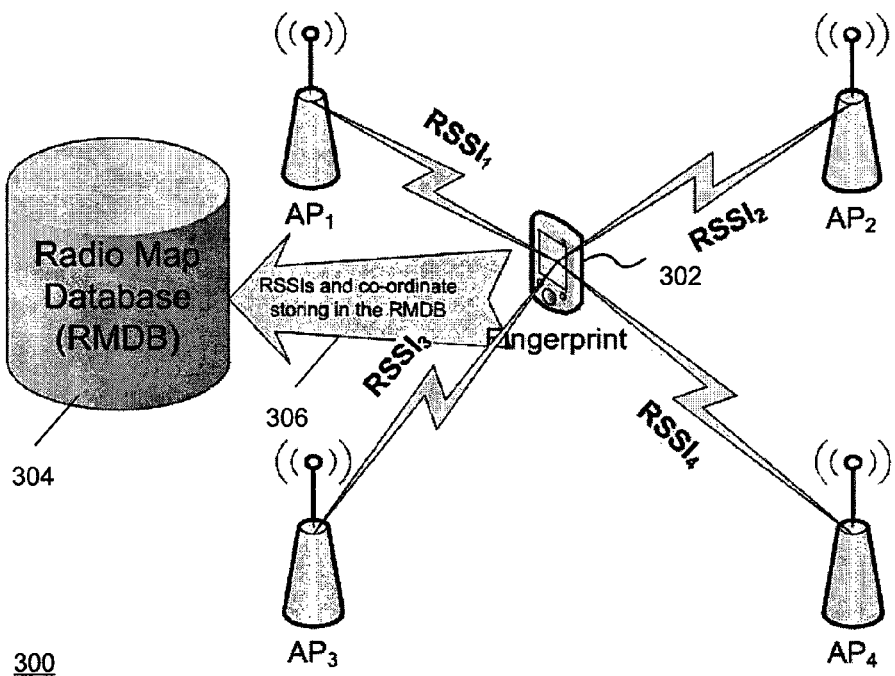
FIG. 3A is a schematic diagram of a prior art WPS offline survey stage for a fingerprint location method.

Referring to FIG. 3A there is illustrated a schematic diagram of a prior art WPS 300 survey stage for a fingerprint location method (fingerprinting), as conducted in the method described with reference to FIG. 5. The WPS 300 as illustrated has four Access Points Ap1 to AP4 and during a survey or calibration stage WiFi signal propagation from each of the Access Points AP1 to AP4 is determined by measuring the RSSIs at reference points with unique known position or reference point coordinates. The RSSIs are measured by dedicated receiver or Mobile Unit (MU) 302 and the received RSSIs and associated reference point coordinates are processed and stored in a Radio Map Database (RMDB) 304. The RSSIs and associated reference point coordinates can be transmitted from the Mobile Unit (MU) 302 to the WPS 300 over a radio link 306 or alternatively uploaded later as will be apparent to a person skilled in the art.

During this survey phase, numerous unique known reference point coordinates, and their associated RSSI for each of the Access Points AP1 to AP4 are stored in the Radio Map Database (RMDB) similar to that of Table 1, as conducted in the method described with reference to FIG. 5. Each row of the Radio Map Database (RMDB) relates to a specific Fingerprint FP (a reference point which is the location where the RSSI measurement was taken), with coordinates X,Y and an associated RSSI for each Access Point AP of the Fingerprint FP. Thus, each fingerprint FP has a unique set of RSSI that can be used to identify the fingerprint FP.

TABLE 1

Radio Map Database (RMDB).

| Fingerprints | Co-ordinates | $AP_1$ | $AP_2$ | $AP_3$ | $AP_4$ | $AP_n$ |
|---|---|---|---|---|---|---|
| $FP_1$ | $X_1, Y_1$ | $RSSI_{1-1}$ | $RSSI_{1-2}$ | $RSSI_{1-3}$ | $RSSI_{1-4}$ | $RSSI_{1-n}$ |
| $FP_2$ | $X_2, Y_2$ | $RSSI_{2-1}$ | $RSSI_{2-2}$ | $RSSI_{2-3}$ | $RSSI_{2-4}$ | $RSSI_{2-n}$ |
| $FP_3$ | $X_3, Y_3$ | $RSSI_{3-1}$ | $RSSI_{3-2}$ | $RSSI_{3-3}$ | $RSSI_{3-4}$ | $RSSI_{3-n}$ |
| $FP_4$ | $X_4, Y_4$ | $RSSI_{4-1}$ | $RSSI_{4-2}$ | $RSSI_{4-3}$ | $RSSI_{4-4}$ | $RSSI_{4-n}$ |
| $FP_m$ | $X_m, Y_m$ | $RSSI_{m-1}$ | $RSSI_{m-2}$ | $RSSI_{m-3}$ | $RSSI_{m-4}$ | $RSSI_{m-n}$ |

Figure 3B:
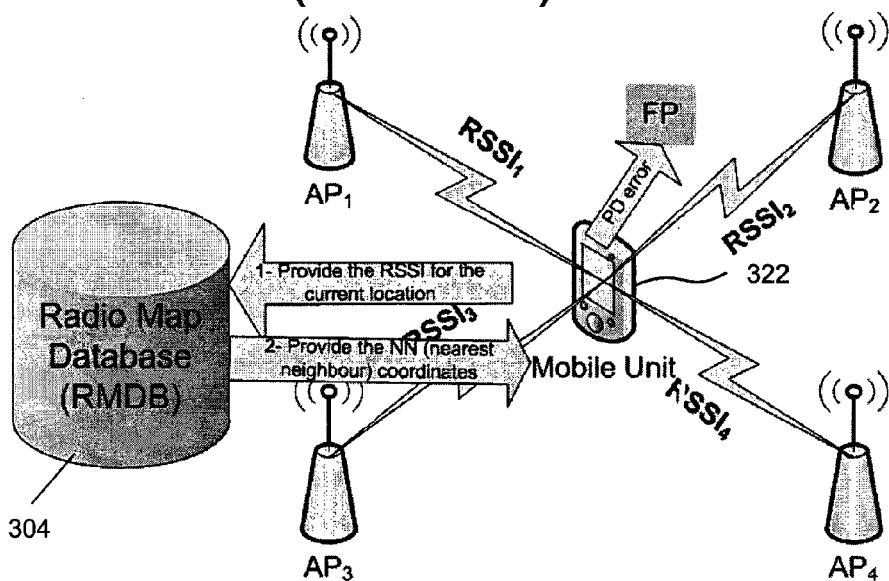
FIG. 3B is a schematic diagram of a prior art WPS positioning online stage for a fingerprint location method.

Referring to FIG. 3B there is illustrated a schematic diagram of a prior art WPS 320 positioning online stage of a fingerprint location method, as conducted in the method described with reference to FIG. 6. As shown, the WPS 320 is in communication with a Mobile Unit (MU) 322 which identifies and then sends the RSSI for each of the Access Points AP1 to AP4 to a system processing unit (not shown). The RSSI for each of the Access Points AP1 to AP4 is typically sent to the system processing unit by a radio link between the Mobile Unit (MU) 322 and one of the Access Points AP1 to AP4. The RSSIs that are stored in the Radio Map Database (RMDB) are then used to estimate the unknown position of the Mobile Unit (MU) 322. This is achieved by finding a Nearest Neighbour (NN) fingerprint FP by selecting the closest matching set of RSSI of a fingerprint FP with the RSSI currently identified and sent from the Mobile Unit (MU) 322 using one of the available Distance Methods (DMs).

Figure 4A:
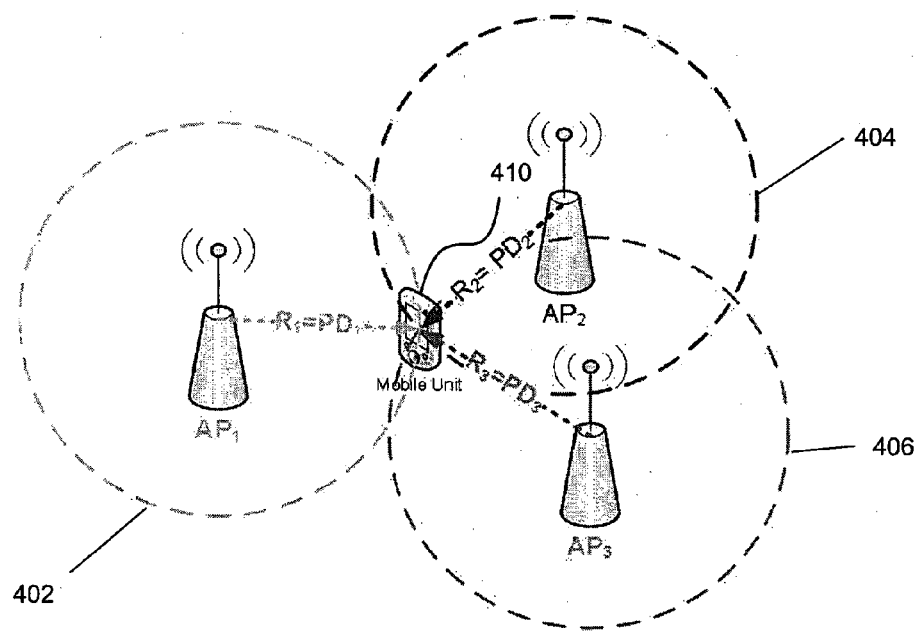
FIG. 4A is a schematic diagram of a prior art WPS that uses a trilateration or multilateration method.

Referring to FIG. 4A there is illustrated a schematic diagram of a prior art WPS 400 that uses a trilateration or multilateration method. The trilateration or Multilateration method used by the WPS 400 is based on the intersection of imaginary circle circumferences 402, 404, 406 associated with a respective one of at least three Access Points AP1 to AP3. Each of the Access Points AP1 to AP3 has co-ordinates known by the WPS 400. The Physical Distance (PD) between a Mobile Unit MU 410 and each Access Point AP1 to AP3 is deemed to be a radius R1 to R3 of a respective circle circumference 402, 404, 406. Thus, once the radius or Physical Distance PD of the three Access Points AP1 to AP3 is determined the position of the Mobile Unit MU 410 can be ascertained.

Figure 4B:
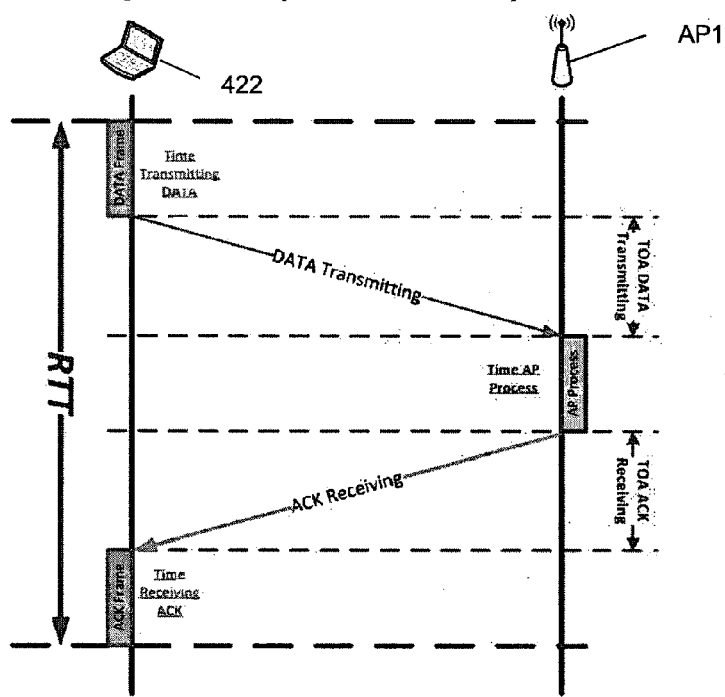
FIG. 4B is a schematic diagram of a prior art geometric method for determining a Physical Distance between a Mobile Unit and an Access Point.

Referring to FIG. 4B there is illustrated a schematic diagram of a prior art method for determining the Physical Distance PD between a Mobile Unit MU 422 and an Access Point AP1. The Physical Distance PD is determined by calculating a frame Round-Trip Time (RTT) that includes a transmitting time (TOA DATA) and an acknowledge time (TOA ACK). The transmitting time (TOA DATA) is determined from a data packet sent from the Mobile Unit MU 422 to the Access Point AP1 and the acknowledge time (TOA ACK) is determined from an acknowledgement packet transmitted from the Access Point AP1 and received by the Mobile Unit MU 422. A processing time (AP Process) of the Access Point AP1 is subtracted from the Round-Trip Time (RTT) and the result is divided by two to obtain an estimated one way Radio Signal Travel Time (RSTT). The Physical Distance PD between the Mobile Unit MU 422 and Access Point AP1 is proportional to the Radio Signal Travel Time RSTT and is thus calculated.

Another method for determining the Physical Distance PD between a Mobile Unit MU and an Access Point AP is by use of RSSI values which are measurements of Radio Frequency power typically measured in dBm. The RSSI values have an inverse relationship to the Physical Distance PD between a transmitter and a receiver. A mathematical algorithm can represent this inverse relationship by building a propagation model of Access Point AP signals for converting the RSSI measurement to a Physical Distance PD measurement. After converting RSSI measurements to Physical Distance PD measurements between each available Access Point AP and the Mobile Unit MU, actual co-ordinates of the Mobile Unit MU can be determined using the PD calculated and the co-ordinates of the APs by intersecting the circles around the 3 APs with radiuses equal to their relevant PD. For better accuracy 4 APs or more can be used and the least squares method in the two dimension coverage area. This least squares method is now described where: i is the number of Access Points AP; $(X_i, Y_i)$ are co-ordinates of an Access Point $AP_i$; $RM_i$ is the Physical Distance PD between an Access Point $AP_i$ and a Mobile Unit MU; $(X_m, Y_m)$ are co-ordinates of the Mobile Unit MU; and by way of example i=4 (number of Access Points AP=4) and should be no less than 3. Thus, using Pythagoras' right angle triangle theorem, the least squares method for calculating $X_m$, $Y_m$ is as follows:

$$(X_i - X_m)^2 + (Y_i - Y_m)^2 = RM_i^2 \tag{1}$$

$$(X_1 - X_m)^2 + (Y_1 - Y_m)^2 = RM_1^2 \tag{2}$$

$$(X_2 - X_m)^2 + (Y_2 - Y_m)^2 = RM_2^2 \tag{3}$$

$$(X_3 - X_m)^2 + (Y_3 - Y_m)^2 = RM_3^2 \tag{4}$$

$$(X_4 - X_m)^2 + (Y_4 - Y_m)^2 = RM_4^2 \tag{5}$$

$$X_1^2 - 2X_m X_1 + X_m^2 + Y_1^2 - 2Y_m Y_1 + Y_m^2 = RM_1^2 \tag{6}$$

$$X_2^2 - 2X_m X_2 + X_m^2 + Y_2^2 - 2Y_m Y_2 + Y_m^2 = RM_2^2 \tag{7}$$

$$X_3^2 - 2X_m X_3 + X_m^2 + Y_3^2 - 2Y_m Y_3 + Y_m^2 = RM_3^2 \tag{8}$$

$$X_4^2 - 2X_m X_4 + X_m^2 + Y_4^2 - 2Y_m Y_4 + Y_m^2 = RM_4^2 \tag{9}$$

$$X_m^2 - 2X_m X_1 + Y_m^2 - 2Y_m Y_1 = RM_1^2 - X_1^2 - Y_1^2 \tag{10}$$

$$X_m^2 - 2X_m X_2 + Y_m^2 - 2Y_m Y_2 = RM_2^2 - X_2^2 - Y_2^2 \tag{11}$$

$$X_m^2 - 2X_m X_3 + Y_m^2 - 2Y_m Y_3 = RM_3^2 - X_3^2 - Y_3^2 \tag{12}$$

$$X_m^2 - 2X_m X_4 + Y_m^2 - 2Y_m Y_4 = RM_4^2 - X_4^2 - Y_4^2 \tag{13}$$

If $RM_i^2 - X_i^2 - Y_i^2$ is considered as a constant value $D_i$ then:

$$X_m^2 - 2X_m X_1 + Y_m^2 - 2Y_m Y_1 = D_1 \tag{14}$$

$$X_m^2 - 2X_m X_2 + Y_m^2 - 2Y_m Y_2 = D_2 \tag{15}$$

$$X_m^2 - 2X_m X_3 + Y_m^2 - 2Y_m Y_3 = D_3 \tag{16}$$

$$X_m^2 - 2X_m X_4 + Y_m^2 - 2Y_m Y_4 = D_4 \tag{17}$$

After subtracting eqn. (17) from eqns. (14), (15) and (16) results in:

$$(X_m^2 - 2X_m X_1 + Y_m^2 - 2Y_m Y_1) - (X_m^2 - 2X_m X_4 + Y_m^2 - 2Y_m Y_4) = D_1 - D_4 \tag{18}$$

$$(X_m^2 - 2X_m X_2 + Y_m^2 - 2Y_m Y_2) - (X_m^2 - 2X_m X_4 + Y_m^2 - 2Y_m Y_4) = D_2 - D_4 \tag{19}$$

$$(X_m^2 - 2X_m X_3 + Y_m^2 - 2Y_m Y_3) - (X_m^2 - 2X_m X_4 + Y_m^2 - 2Y_m Y_4) = D_3 - D_4 \tag{20}$$

$$X_m^2 - 2X_m X_1 + Y_m^2 - 2Y_m Y_1 - X_m^2 + 2X_m X_4 - Y_m^2 + 2Y_m Y_4 = D_1 - D_4 \tag{21}$$

$$X_m^2 - 2X_m X_2 + Y_m^2 - 2Y_m Y_2 - X_m^2 + 2X_m X_4 - Y_m^2 + 2Y_m Y_4 = D_2 - D_4 \tag{22}$$

$$X_m^2 - 2X_m X_3 + Y_m^2 - 2Y_m Y_3 - X_m^2 + 2X_m X_4 - Y_m^2 + 2Y_m Y_4 = D_3 - D_4 \tag{23}$$

$$-2X_m X_1 - 2Y_m Y_1 + 2X_m X_4 + 2Y_m Y_4 = D_1 - D_4 \tag{24}$$

$$-2X_m X_2 - 2Y_m Y_2 + 2X_m X_4 + 2Y_m Y_4 = D_2 - D_4 \tag{25}$$

$$-2X_m X_3 - 2Y_m Y_3 + 2X_m X_4 + 2Y_m Y_4 = D_3 - D_4 \tag{26}$$

$$2X_m(X_4 - X_q) + 2Y_m(Y_4 - Y_q) = D_1 - D_4 \tag{27}$$

$$2X_m(X_4 - X_2) + 2Y_m(Y_4 - Y_2) = D_2 - D_4 \tag{28}$$

$$2X_m(X_4 - X_3) + 2Y_m(Y_4 - Y_3) = D_3 - D_4 \tag{29}$$

$$(X_4 - X_1)X_m + (Y_4 - Y_1)Y_m = \frac{D_1 - D_4}{2} \tag{30}$$

$$(X_4 - X_2)X_m + (Y_4 - Y_2)Y_m = \frac{D_2 - D_4}{2} \tag{31}$$

$$(X_4 - X_3)X_m + (Y_4 - Y_3)Y_m = \frac{D_3 - D_4}{2} \tag{32}$$

If $$\left[\epsilon_i = \frac{D_i - D_4}{2}, \mu_i = X_4 - X_i \ \& \ \delta_i = Y_4 - Y_i\right]$$

where i=1, 2 & 3 then:

$$\epsilon_1 = \frac{D_1 - D_4}{2}, \epsilon_2 = \frac{D_2 - D_4}{2} \ \& \ \epsilon_3 = \frac{D_3 - D_4}{2} \quad (33)$$

$$\mu_1 = X_4 - X_1, \mu_2 = X_4 - X_2 \ \& \ \mu_3 = X_4 - X_3 \quad (34)$$

$$\delta_1 = Y_4 - Y_1, \delta_2 = Y_4 - Y_2 \ \& \ \delta_3 = Y_4 - Y_3 \quad (35)$$

$$\begin{bmatrix} \mu_1 & \delta_1 \\ \mu_2 & \delta_2 \\ \mu_3 & \delta_3 \end{bmatrix} \begin{bmatrix} X_m \\ Y_m \end{bmatrix} = \begin{bmatrix} \epsilon_1 \\ \epsilon_2 \\ \epsilon_3 \end{bmatrix} \quad (36)$$

$$A = \begin{bmatrix} \mu_1 & \delta_1 \\ \mu_2 & \delta_2 \\ \mu_3 & \delta_3 \end{bmatrix}, \vec{x} = \begin{bmatrix} X_m \\ Y_m \end{bmatrix} \text{ and } \vec{b} = \begin{bmatrix} \epsilon_1 \\ \epsilon_2 \\ \epsilon_3 \end{bmatrix} \quad (37)$$

$$A\vec{x} = \vec{b} \quad (38)$$

Since the matrices A & $\vec{b}$ in eqn. (38) are with 3 rows when the matrix $\vec{x}$ is with 2 rows, the unknown values $X_m$ & $Y_m$ will have 3 values when both sides of eqn. (38) are multiplied by $A^{-1}$. The reason for the extra row is because of the $4^{th}$ equation that came from the $4^{th}$ Access point AP for the sake of more accuracy. If the number of the observed Access Points APs is more than the number of the output required +1 then this least square method should be used. Using the least square method eqn. (38) can be modified for finding of the 2 unknown values $X_m$ & $Y_m$ using the 3 rows matrixes that came from the usage of the $4^{th}$ AP. To achieve that both sides need to be multiplied by $(A^T)$ as follows:

$$A^T = \begin{bmatrix} \mu_1 & \mu_2 & \mu_3 \\ \delta_1 & \delta_2 & \delta_3 \end{bmatrix} \quad (39)$$

$$A^T A \vec{x} = A^T \vec{b} \quad (40)$$

$$M = A^T A = \begin{bmatrix} \mu_1 & \mu_2 & \mu_3 \\ \delta_1 & \delta_2 & \delta_3 \end{bmatrix} \begin{bmatrix} \mu_1 & \delta_1 \\ \mu_2 & \delta_2 \\ \mu_3 & \delta_3 \end{bmatrix} = \quad (41)$$

$$\begin{bmatrix} \mu_1^2 + \mu_2^2 + \mu_3^2 & \mu_1\delta_1 + \mu_2\delta_2 + \mu_3\delta_3 \\ \delta_1\mu_1 + \delta_2\mu_2 + \delta_3\mu_3 & \delta_1^2 + \delta_2^2 + \delta_3^2 \end{bmatrix}$$

$$\vec{B} = A^T \vec{b} = \begin{bmatrix} \mu_1 & \mu_2 & \mu_3 \\ \delta_1 & \delta_2 & \delta_3 \end{bmatrix} \begin{bmatrix} \epsilon_1 \\ \epsilon_2 \\ \epsilon_3 \end{bmatrix} = \begin{bmatrix} \mu_1\epsilon_1 + \mu_2\epsilon_2 + \mu_3\epsilon_3 \\ \delta_1\epsilon_1 + \delta_2\epsilon_2 + \delta_3\epsilon_3 \end{bmatrix} \quad (42)$$

$$M\vec{x} = \vec{B} \quad (43)$$

Multiplying both sides by the $M^{-1}$ leads to:

$$M^{-1} M \vec{x} = M^{-1} \vec{B} \quad (44)$$

$$\vec{x} = M^{-1} \vec{B} = \begin{bmatrix} X_m \\ Y_m \end{bmatrix} \quad (45)$$

Figure 5:
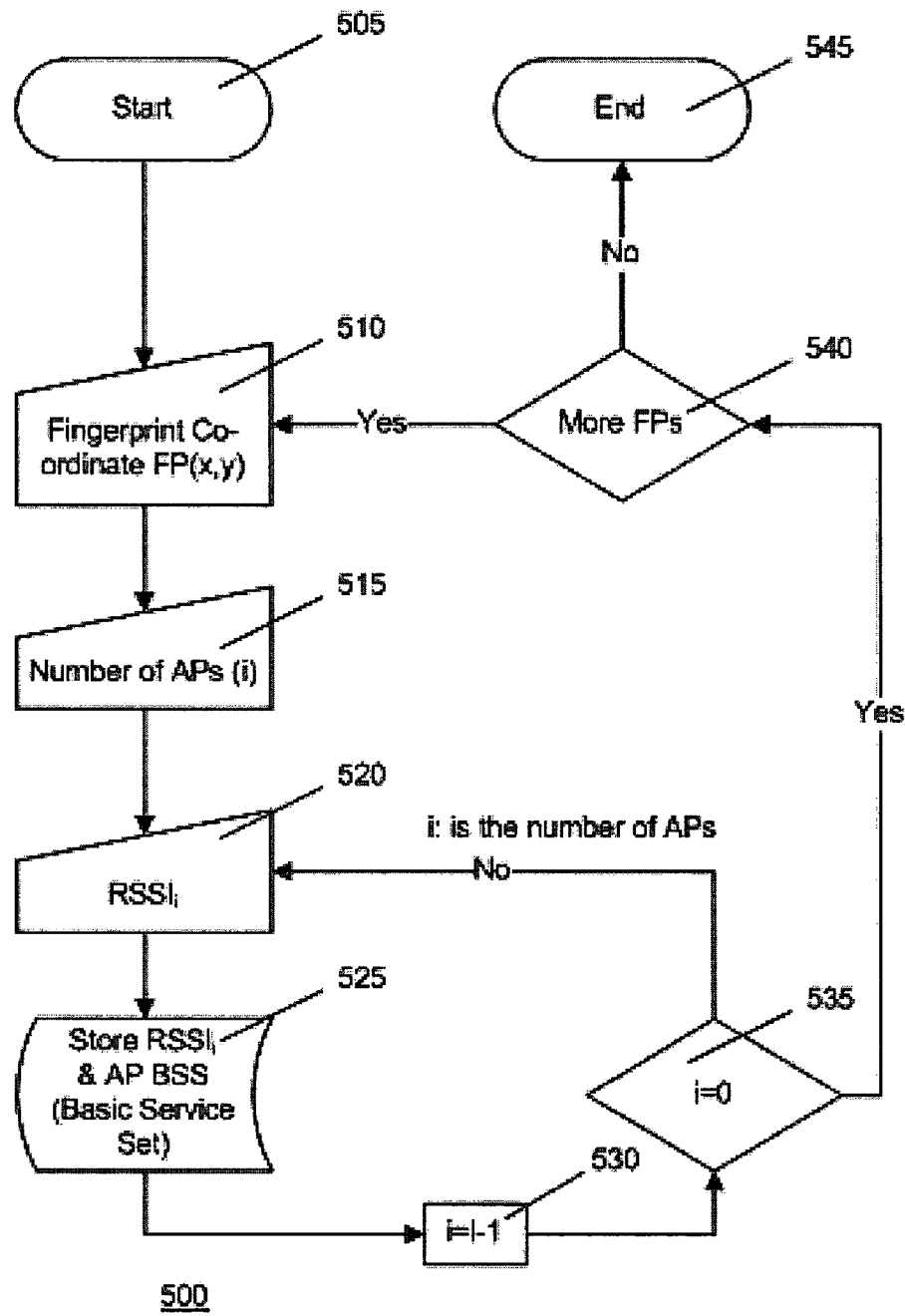
FIG. 5 is a flow diagram illustrating the offline surveying part of the Fingerprint-based method of determining a position of a mobile Unit in communication with a Network.

Referring to FIG. 5 there is a flow diagram illustrating an offline part of a prior art method 500 of determining a position of a mobile Unit MU in communication with a Network (NW). The Network (NW) is typically a WiFi® network with at least three Access Points APs and the method 500 is initiated a start block 505. Although the method is capable of implementation with a single AP, results are expected to be particularly sub-optimal in such a condition, whereby 3 APs are deemed more suitable. The method 500 includes, at a block 510, obtaining and storing location co-ordinates of a plurality of reference points or fingerprints FP(x,y) of the Network (NW). At a block 515 an integer counter i is set to the number of Access Points APs in the Network (NW) and at a block 520 the method 500 performs obtaining access point received signal strength indicators RSSIs received at each one of the reference points or fingerprints FP(x,y), In this regard, each of the access point received signal strength indicators RSSI provides an indication of the signal strength of a signal sent from one of the Access Points APs.

A storing of the access point received signal strength indicators RSSIs received at each one of the reference points or fingerprints FP(x,y) is then performed at a block 525. The access point received signal strength indicators RSSIs received at each one of the reference points or fingerprints FP(x,y), location co-ordinates of reference points or fingerprints FP(x,y) and the Access Points APs Basic Service Set (BSS) are stored in a Radio Map Database (RMDB) as shown in Table 1 above. This Radio Map Database (RMDB) comprises m fingerprints FP and n Access Points AP.

The method 500 creates the Radio Map Database (RMDB) sequentially for each fingerprint and for each RSSI received from an Access Point AP. Thus at a block 530, the integer counter i (that was initially set to the number of Access Points AP) is decremented and a test block 535 checks to see if all RSSIs for all Access Points AP at the current fingerprint FP have been received and stored. If all RSSIs have not been received and stored then the method repeats blocks 520 to 530, otherwise a further test block 540 determines if there are any more fingerprints FP to be processed. If there are more fingerprints FP to be processed the method 500 returns to block 510, otherwise the method 500 terminates at an end block 545. The method 500 illustrates a surveying or survey stage. First the co-ordinate of the fingerprint FP are entered or stored followed by the number i of Access Points APs. Within each loop, the RSSI of that Access Point AP will be stored and marked with the co-ordinate of the fingerprint FP and a Basic Service Set (BSS) of that Access Point AP.

Figure 6:
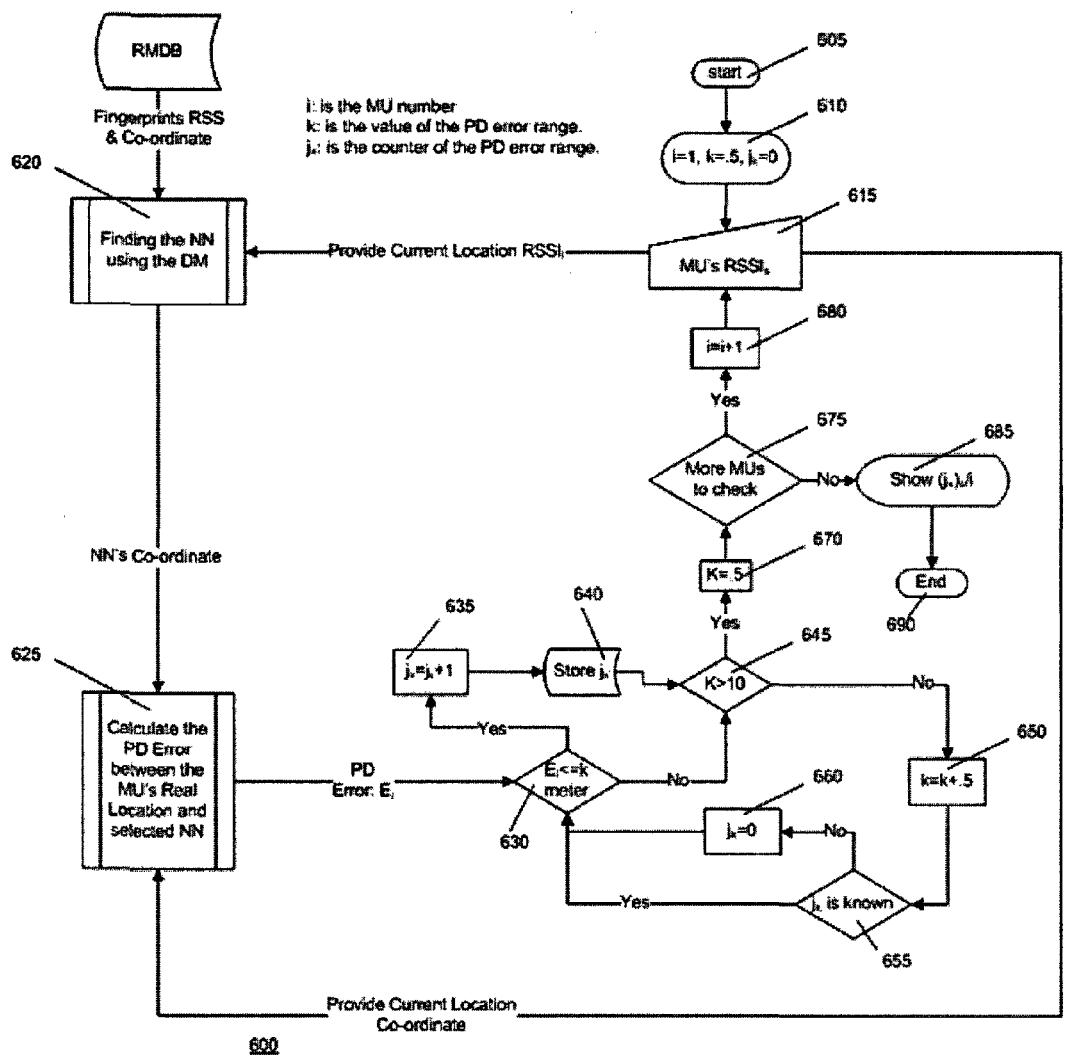
FIG. 6 is a flow diagram illustrating the online positioning part of the Fingerprint-based method used for determining error ranges of data stored in a Radio Map Database in accordance with a preferred embodiment of then present invention.

Referring to FIG. 6 there is a flow diagram illustrating the online part of a prior art method 600 used for the positioning phase and determining error ranges of data stored in the Radio Map Database (RMDB). The method 600 is performed after method 500 and identifies suitable Nearest Neighbour (NN) reference point or fingerprint FP(x,y) locations stored in the Radio Map Database (RMDB), using one of the Distance Methods (DMs) available. The co-ordinates of the selected fingerprint will be the retrieved position assumed for the MU.

After a start block 605, i is set to 1; $j_k$ is set to 0 and k is set to 0.5 at an initializing block 610 and at a sending block 615 a Mobile Unit MU positioned at known coordinates provides a current location RSSI to a finding block 620. The RSSIs of the current position are then compared with the RMDB to find the Nearest Neighbour (NN) coordinates using different Distance Methods (DMs) which are well known in the art. At a block 625 the determined Nearest Neighbour NN co-ordinates are compared with the actual co-ordinate of the MU to calculate the accuracy represented by the Physical Distance PD error ($E_i$). The PD error $E_i$ is then examined at blocks 635 to 660 to determine if it is within the first 0.5 m PD error range (k). If it is within the range, the counter ($j_k$) of that PD error will increase by 1. However if it is not, checks are made to see if it is within the $2^{nd}$, $3^{rd}$, $4^{th}$ PD error range $E_i$ etc. Once all the PD Error Ranges up to 10 meters (K>10) are checked, then k will be reset to 0.5 m at a reset block 670 and the method 600 determines at a block 675 if there are any more Mobile Unit MUs to check. If there are more Mobile Unit MUs to check then i is incremented at a block 680 and thereafter block 615 is repeated. Otherwise results of the error ranges are displayed at a displaying block 685 and the method 600 terminates at an end block 690. The method 600 can be repeated, if required, in order to obtain lower error ranges by moving one or more reference point of fingerprint FP(x,y) locations.

Figure 7:
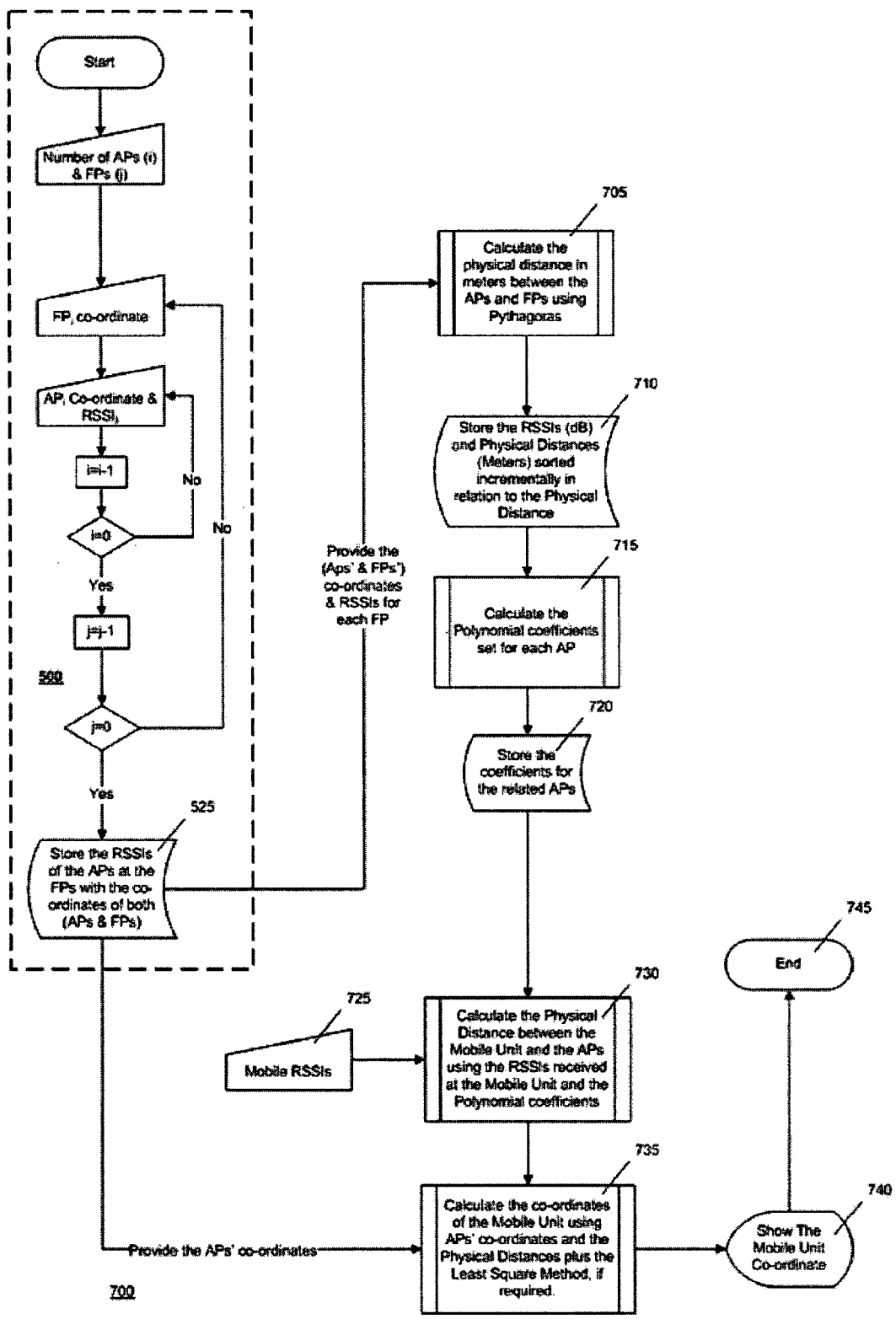
FIG. 7 is a flow diagram illustrating a method of determining a position of a Mobile Unit in communication with a Network in accordance with a first embodiment of the present invention, wherein the network is considered as a single environment not containing sub-regions.
Figure 8:
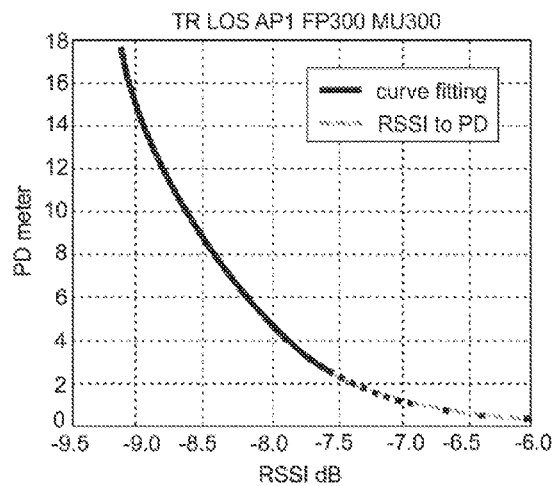
FIGS. 8 to 11 are examples of curves used in a curve fitting approach of the flow diagram of FIG. 7.
Figure 9:
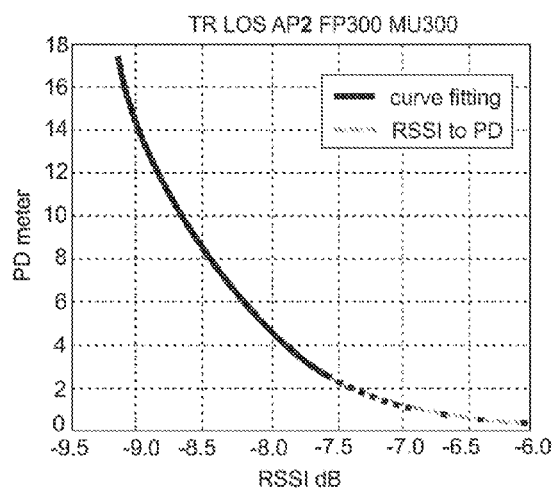
Figure 10:
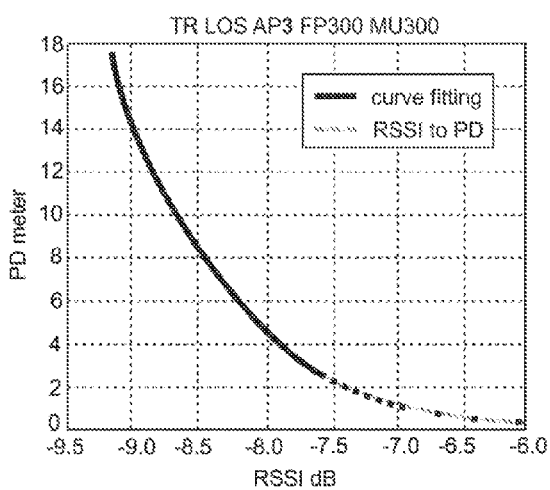
Figure 11:
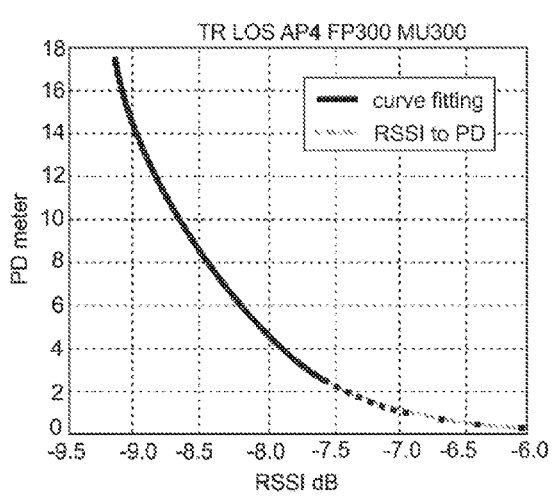

Referring to FIG. 7 there is a flow diagram illustrating a method 700 of determining a position of a Mobile Unit MU in communication with a Network (NW) in accordance with another embodiment of the present invention, which considers the network area as a single environment. The method 700 includes the method 500 as described above and after the Radio Map Database (RMDB) is created at block 525, additionally including the co-ordinates of the Access Points (APs) as in Table 2, a block 705 calculates Physical Distances PD, typically in meters, between the Access Points APs(x,y) and fingerprints FP(x,y) from the data stored in the Radio Map Database (RMDB). More specifically, the Physical Distances PD are calculated using Pythagoras' right angle triangle theorem as described above in eqn. (1).

TABLE 2

Radio Map Database (RMDB).

| FPs | APs Co-ordinates | $AP_1$ $X_{AP1}, Y_{AP1}$ | $AP_2$ $X_{AP2}, Y_{AP2}$ | $AP_3$ $X_{AP3}, Y_{AP3}$ | — | $AP_n$ $X_{APn}, Y_{APn}$ |
|---|---|---|---|---|---|---|
| $FP_1$ | $X_{FP1}, Y_{FP1}$ | $RSSI_{1,1}$ | $RSSI_{1,2}$ | $RSSI_{1,3}$ | — | $RSSI_{1,n}$ |
| $FP_2$ | $X_{FP2}, Y_{FP2}$ | $RSSI_{2,1}$ | $RSSI_{2,2}$ | $RSSI_{2,3}$ | — | $RSSI_{2,n}$ |
| $FP_3$ | $X_{FP3}, Y_{FP3}$ | $RSSI_{3,1}$ | $RSSI_{3,2}$ | $RSSI_{3,3}$ | — | $RSSI_{3,n}$ |
| . | . | . | . | . | — | . |
| . | . | . | . | . | | . |
| . | . | . | . | . | | . |
| $FP_m$ | $X_{FPm}, Y_{FPm}$ | $RSSI_{m,1}$ | $RSSI_{m,2}$ | $RSSI_{m,3}$ | — | $RSSI_{m,n}$ |

Next, at a sorting and storing block 710, the RSSIs and associated Physical Distances PD of each Access Points AP for a specific fingerprint FP are sorted in ascending order (based on the Physical Distances PD for each fingerprint FP) and stored in a Radio Map Physical Distance Database (RMPDDB) of Table 3.

TABLE 3

Radio Map Physical Distance Database (RMPDDB).

| | $AP_1$ | | $AP_2$ | | $AP_3$ | | — | $AP_n$ | |
|---|---|---|---|---|---|---|---|---|---|
| $FP_1$ | $RSSI_{1-1}$ | $PD_{1-1}$ | $RSSI_{1-2}$ | $PD_{1-2}$ | $RSSI_{1-3}$ | $PD_{1-3}$ | — | $RSSI_{1-n}$ | $PD_{1-n}$ |
| $FP_2$ | $RSSI_{2-1}$ | $PD_{2-1}$ | $RSSI_{2-2}$ | $PD_{2-2}$ | $RSSI_{2-3}$ | $PD_{2-3}$ | — | $RSSI_{2-n}$ | $PD_{2-n}$ |
| $FP_3$ | $RSSI_{3-1}$ | $PD_{3-1}$ | $RSSI_{3-2}$ | $PD_{3-2}$ | $RSSI_{3-3}$ | $PD_{3-3}$ | — | $RSSI_{3-n}$ | $PD_{3-n}$ |
| $FP_4$ | $RSSI_{4-1}$ | $PD_{4-1}$ | $RSSI_{4-2}$ | $PD_{4-2}$ | $RSSI_{4-3}$ | $PD_{4-3}$ | — | $RSSI_{4-n}$ | $PD_{4-n}$ |
| . | . | . | . | . | . | . | — | . | . |
| . | . | . | . | . | . | . | | . | . |
| . | . | . | . | . | . | . | | . | . |
| $FP_m$ | $RSSI_{m-1}$ | $PD_{m-1}$ | $RSSI_{m-2}$ | $PD_{m-2}$ | $RSSI_{m-3}$ | $PD_{m-3}$ | — | $RSSI_{m-n}$ | $PD_{m-n}$ |

At a calculating block 715, the method 700 performs calculating or determining Polynomial Curve Fitting (PCF) coefficients of a polynomial function representative of a relationship between the stored RSSIs and the stored Physical Distances PDs for each Access Point AP (the Physical Distances PDs between the reference points FP and each one of the access points AP). The coefficients PCF are typically calculated or determined by a curve fitting approach to find the most accurate coefficients PCF for each Access Point AP. Examples of curves used in this curve fitting approach are illustrated in FIGS. 8 to 11. These curves are represented in coefficient sets for each Access Point independently out of the RMPDDB database, with the stored access point received signal strength indicators RSSIs and Physical Distances PDs. The fitting thus includes selecting a representative coefficients set $(X^0, X^1, X^2, X^3, X^4, X^5 - - - X^P)$ for the curve from the RMPDDB database that is representative of the stored access point received signal strength indicators and the stored physical distance between the reference points and the Access Points (APs). The PCF then obtains the coefficients from the RMPDDB database that are associated with the representative curve. After the completion of the calculating block 715 a Polynomial Curve Fitting Database (PCFDB) of Table 4 is created and stored in the Network (NW).

TABLE 4

Polynomial Curve Fitting Database (PCFDB)

| | $AP_1$ | $AP_2$ | $AP_3$ | $AP_4$ | — | $AP_n$ |
|---|---|---|---|---|---|---|
| $X^0$ | $PCF\text{-}CO_{0\text{-}1}$ | $PCF\text{-}CO_{0\text{-}2}$ | $PCF\text{-}CO_{0\text{-}3}$ | $PCF\text{-}CO_{0\text{-}4}$ | — | $PCF\text{-}CO_{0\text{-}n}$ |
| $X^1$ | $PCF\text{-}CO_{1\text{-}1}$ | $PCF\text{-}CO_{1\text{-}2}$ | $PCF\text{-}CO_{1\text{-}3}$ | $PCF\text{-}CO_{1\text{-}4}$ | — | $PCF\text{-}CO_{1\text{-}n}$ |
| $X^2$ | $PCF\text{-}CO_{2\text{-}1}$ | $PCF\text{-}CO_{2\text{-}2}$ | $PCF\text{-}CO_{2\text{-}3}$ | $PCF\text{-}CO_{2\text{-}4}$ | — | $PCF\text{-}CO_{2\text{-}n}$ |
| $X^3$ | $PCF\text{-}CO_{3\text{-}1}$ | $PCF\text{-}CO_{3\text{-}2}$ | $PCF\text{-}CO_{3\text{-}3}$ | $PCF\text{-}CO_{3\text{-}4}$ | — | $PCF\text{-}CO_{3\text{-}n}$ |
| $X^4$ | $PCF\text{-}CO_{4\text{-}1}$ | $PCF\text{-}CO_{4\text{-}2}$ | $PCF\text{-}CO_{4\text{-}3}$ | $PCF\text{-}CO_{4\text{-}4}$ | — | $PCF\text{-}CO_{4\text{-}n}$ |
| $X^5$ | $PCF\text{-}CO_{5\text{-}1}$ | $PCF\text{-}CO_{5\text{-}2}$ | $PCF\text{-}CO_{5\text{-}3}$ | $PCF\text{-}CO_{5\text{-}4}$ | — | $PCF\text{-}CO_{5\text{-}n}$ |
| . | . | . | . | . | — | . |
| . | . | . | . | . |   | . |
| . | . | . | . | . |   | . |
| $X^P$ | $PCF\text{-}CO_{P\text{-}1}$ | $PCF\text{-}CO_{P\text{-}2}$ | $PCF\text{-}CO_{P\text{-}3}$ | $PCF\text{-}CO_{P\text{-}4}$ | — | $PCF\text{-}CO_{P\text{-}n}$ |

Once the Polynomial Curve Fitting Database (PCFDB) is created the offline phase of the method 700 is completed and the Network (NW) can then be used online to determine a position of a Mobile Unit MU that is in communication with the Network (NW). This is achieved at a block 725 by obtaining RSSIs at the Mobile Unit MU from the at least three Access Points APs in the Network (NW) and then at a block 730 the method 700 effects a calculating Physical Distances PD between the Mobile Unit MU and the Access Points APs based on the received RSSI and the coefficients PCF for each of the Access Points APs that are stored in the Polynomial Curve Fitting Database (PCFDB). The method 700 then, at a calculating block 735, provides for calculating a position of the Mobile Unit MU based on the calculated Physical Distances PDs between the Mobile Unit MU and each of the Access Points APs. In this specific embodiment the position of the Mobile Unit MU is calculated by least squares method as described above with reference to eqns. (1) to (38).

The Network (NW), at a block 740, displays or uses the determined position of the Mobile Unit MU such that its movements can be mapped and/or the calculated position and location specific messages (that are dependent on the calculated position of the Mobile Unit MU) can be sent to the Mobile Unit MU. Such location specific messages can be direction instructions, location specific advertisements, location specific hazards, road closures etc. The method 700 then terminates at an end block 745 and the online phases of blocks 725 to 740 can be repeated without repeating the offline phases of blocks 500 and 705 to 720. The method as described is particularly useful for environments with line of sight and/or non-line of sight RSSI networks, i.e. when the environment in the coverage area does not include multiple sub-regions. However, if the Network NW encompasses multiple sub-regions that can typically occur in a building, the Radio Map Database (RMDB) is divided into groups of reference point of fingerprint FP(x,y) locations. Each group GP includes a number of fingerprints having similar relationship to each Access Point, respectively whether line of sight or non-line of sight, and are processed by the method 700 and stored in the Polynomial Curve Fitting Database (PCFDB) as will be apparent to a person skilled in the art. Also, at block 730 a Nearest Neighbour NN group GP is identified using any known Distance Method (DM) techniques such as the City Block technique, which is recommended, as will be apparent to a person skilled in the art.

Indoor environments may consist of a large, single-volume office or of multiple volumes when the office is divided in multiple rooms or external environments. Whilst the method as described with reference to the embodiment of FIG. 7 is apt for single-volume environments, the volume partitions inherent to multiple-volume environments inherently impede signal propagation characteristics, resulting in marginally sub-optimal results with that method. Accordingly, a further embodiment of the method, named Ubiquitous Multi-Environment High Dynamic Indication ('U MEHDI') uses the database of stored reference points (RSSIs and co-ordinates) to specify the current external environment by matching it with the current RSSIs using the Fingerprint distance method, which is room to room and level to level accurate. In this embodiment, the reference points collected during the offline survey stage are grouped in number of distinct volumes, or rooms, or external environments, and are then processed to find the set of coefficients which correspond to each room respectively.

The invention is expected to be used mostly with indoor environments, which are expected to feature multi sub-environments or sub-regions, for instance office areas with multiple rooms and partitions. Accordingly, an embodiment of the method according to the invention considers processing for each room or region independently, wherein more than one set of coefficient databases is obtained, and each one representing a respective region. Since a Mobile Unit (MU) is not aware of the region to which it currently belongs in the environment, the MU provides its current received signal strength indicators to the network for finding the Nearest Neighbour (NN) reference point first, by using a Distance Method such as City Block. This technique, which is commonly called Fingerprint, is known to be accurate both room-to-room and level-to-level. A correct coefficient database is then selected for use for that distinct region within the environment.

Figure 12:
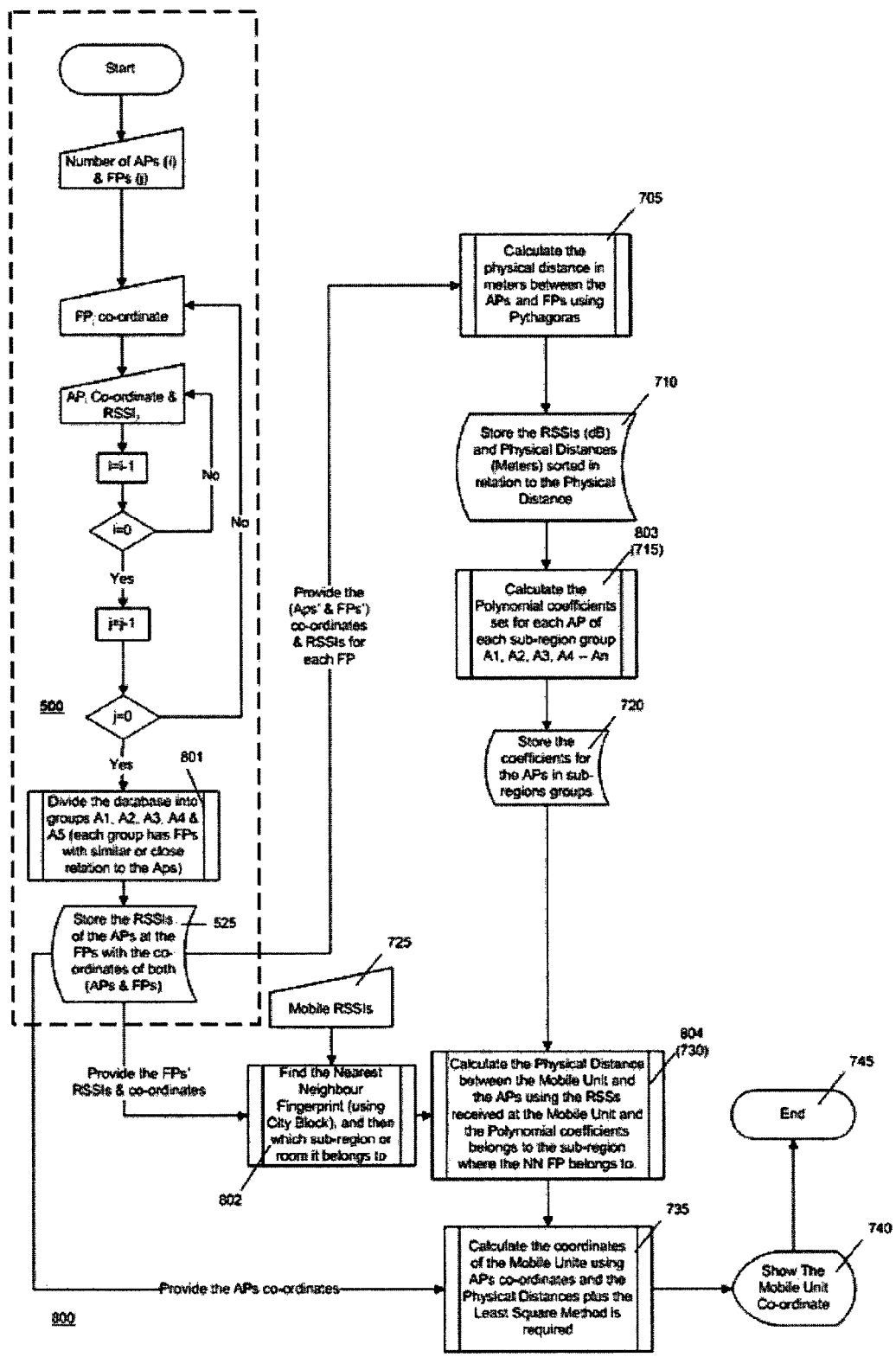
FIG. 12 is a flow diagram illustrating a method of determining a position of a Mobile Unit in communication with a Network in accordance with a second embodiment of then present invention, wherein the network is considered, during both the offline and online phases of the method, as an environment comprising a plurality of sub-regions.
Figure 13:
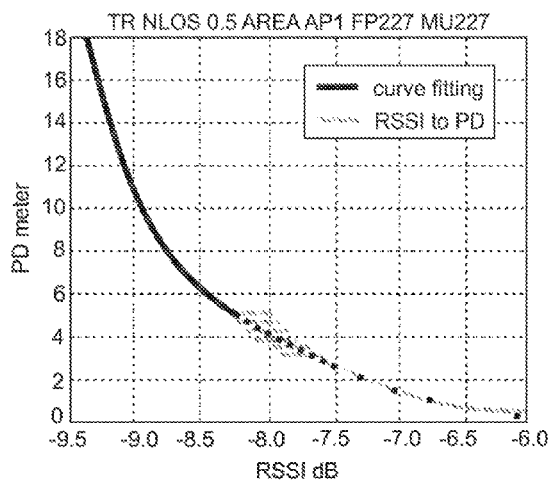
FIGS. 13 to 16 are again examples of curves used in a curve fitting approach of the flow diagram of FIG. 7, for a network in an environment comprising a plurality of sub-regions, however considered as a single environment not containing sub-regions, thus illustrating its lesser positional accuracy relative to the curve fitting approach of the flow diagram of FIG. 12.
Figure 14:
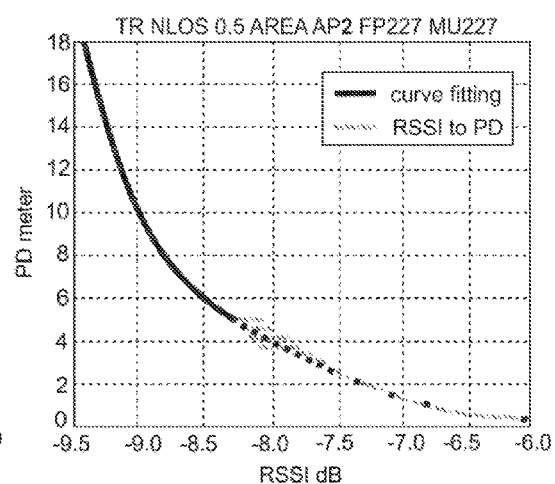
Figure 15:
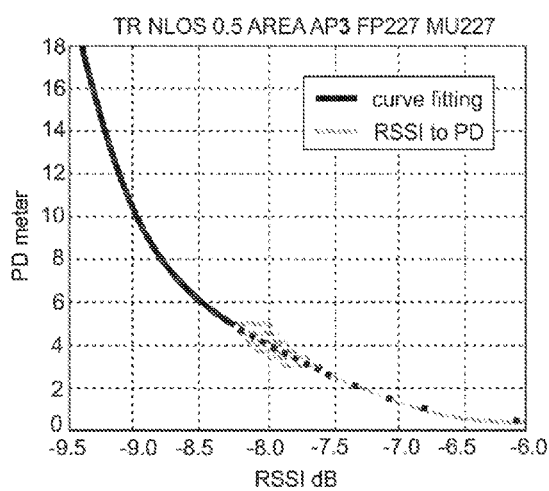
Figure 16:
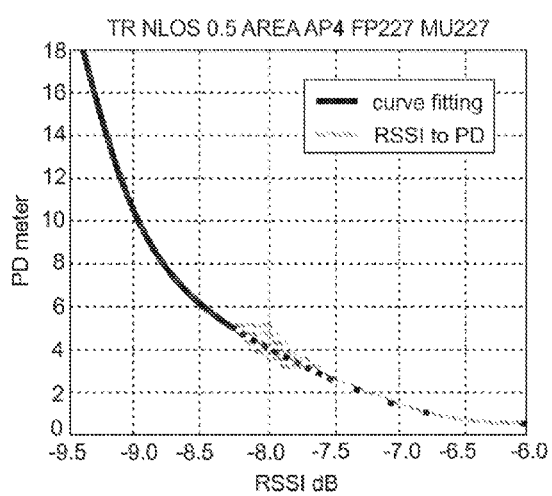

Referring to FIG. 12 now, there is therefore shown a flow diagram illustrating a method 800 of determining a position of a Mobile Unit MU in communication with a Network (NW) in accordance with another embodiment of the present invention, which considers the network area as a plurality of distinct environments or, as the case may be, an environment composed of sub-regions. This embodiment is substantially similar to the method described with reference to FIG. 7, however here the method applies the fingerprint polynomial curve fitting principle to the multiple environments which constitute the network coverage area, each having a different propagation model to different Access Points. This embodiment is referred to as the Ubiquitous Multi-Environment High Dynamic Indication (U MEHDI)

In this embodiment, each volume, room, portion or sub-region of the environment in the coverage area, is considered as a distinct environment with different environment parameters in relation to available access points, and for instance the outside area surrounding a building is considered an area completely separate from the inside area. Therefore, after doing the first step of the offline phase which is collecting the RMDB as previously described, in this embodiment the RMPDDB is filtered at step 801 according to the distinct environment to which the FPs belong, in addition to the access point to which it is related, then stored in separate, respective RMDBs. The remaining steps of the offline phase are processed substantially as described above, for each RMDB separately, which will lead to multiple RMPDDBs and PCFDBs, equal to the number of areas suggested. Not considering the multiple sub-regions, and processing the RMDB of an environment with multiple sub-regions as a single volume, results in errors which occur during the Polynomial Curve Fitting (PCF) stage, as shown in FIGS. 13 to 16, all of which clearly identify a confusion of the relation between the Physical Distance (PD) and the RSSIs for each Access Point.

Figure 17:
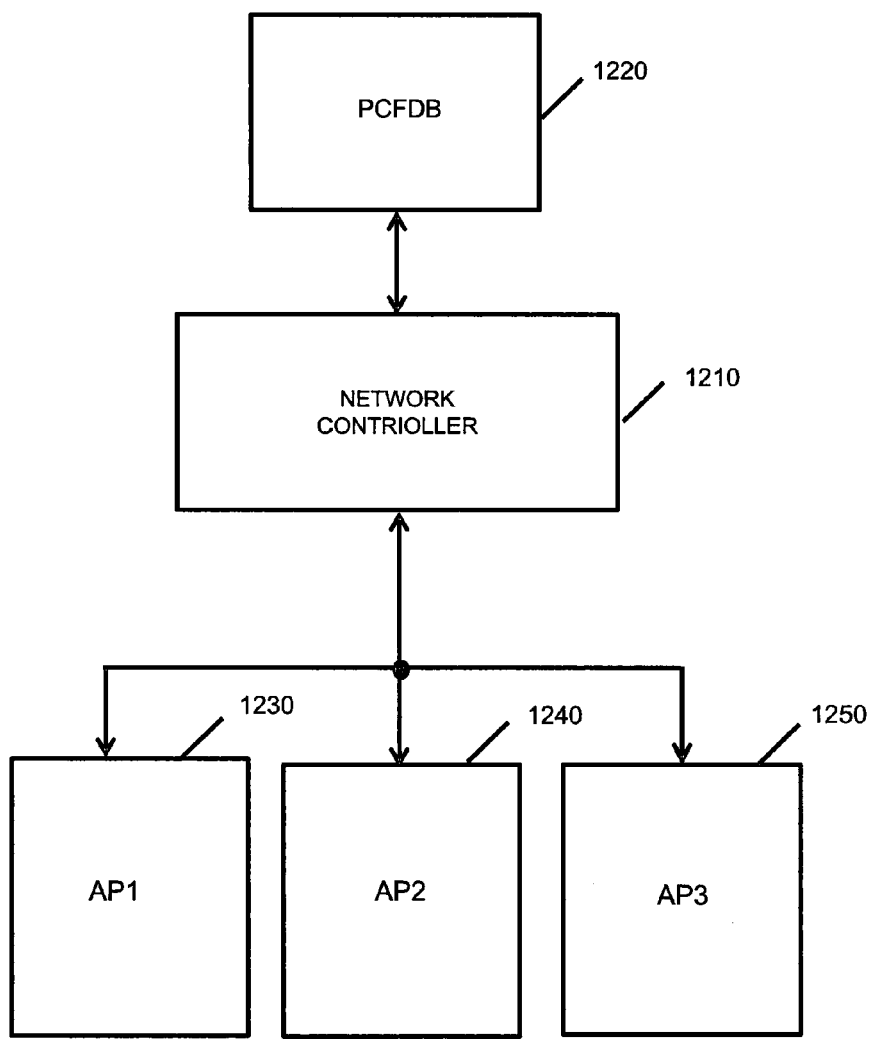
FIG. 17 is a block diagram of a system for determining a position of a Mobile Unit in communication with a network in accordance with a preferred embodiment of then present invention.

Referring to FIG. 17 there is illustrated a block diagram of a system 1200 for determining a position of a Mobile Unit in communication with the Network NW in accordance with a preferred embodiment of then present invention. The system 1200 has a network controller 1210 and a plurality of access points 1230, 1340, 1250 providing radio communication links for the Network NW. These access points 1230, 1340, 1250 are coupled to the controller 1210 and there is also a database 1220 coupled to the controller 1210. This database 1220 is a Radio Map Physical Distance Database (RMPDDB) and example of which is shown in Table 3 above. This database 1220 provides a medium for storing coefficients of a polynomial function representative of a relationship between access points' received signal strength indicators and a physical distance between reference points in the network and each one of the access points. The system 1200 is created and operates as described above with reference to FIGS. 5 to 12.

Advantageously, the present invention provides a relatively efficient method and system of determining a position of a Mobile Unit MU in a Network NW. More specifically, the coefficients PCF in the Polynomial Curve Fitting Database (PCFDB) provide for efficient and relatively accurate determination of the PD between the Mobile Unit MU and each relevant Access Point AP based on the received RSSI.

The invention claimed is:

1. A method of determining a position of a mobile unit in communication with a network that has at least three access points, the method comprising:
   obtaining and storing location co-ordinates of a plurality of reference points and access points of the network;
   calculating and storing a physical distance between each one of the reference points and each one of the access points based on their stored co-ordinates in a database;
   obtaining and storing access point received signal strength indicators received at each one of the reference points in the database, wherein each of the access point received signal strength indicators provides an indication of the signal strength of a signal sent from one of the access points;
   determining coefficients of a polynomial function by curve fitting, wherein the coefficients are representative of a relationship between the stored access point received signal strength indicators and the stored physical distance between the reference points and each one of the access points and wherein the curve is representative of the propagation of the stored access points in an offline mode;
   obtaining received signal strength indicators at the mobile unit from the access points;
   calculating a physical distance between the mobile unit and each of the access points based on the received signal strength indicators obtained at the mobile unit and the coefficients for each of the access points; and
   calculating a position of the mobile unit based on the calculated physical distances between the mobile unit and each of the access points;
   wherein determining coefficients further comprises processing the database storing the received signal strength indicators of the access points and the physical distances between the reference points and the access points, and outputting the coefficients.

2. The method of determining a position of a mobile unit, as claimed in claim 1, wherein the network is in an environment comprising sub-regions, and the step of determining coefficients further comprises determining coefficients for each sub-region respectively.

3. The method of determining a position of a mobile unit, as claimed in claim 2, comprising the further step of determining the sub-region wherein the MU is located with a fingerprint positioning method.

4. The method of determining a position of a mobile unit, as claimed in claim 3, wherein the fingerprint positioning method comprises the steps of finding a Nearest Neighbour using a Distance Method.

5. The method of determining a position of a mobile unit, as claimed in claim 4, wherein the Distance Method is City Block.

6. The method of determining a position of a mobile unit, as claimed in claim 1, further including informing the mobile unit the calculated position thereof.

7. The method of determining a position of a mobile unit, as claimed in claim 1, further including sending a message to the mobile unit, wherein the message is dependent on the calculated position of the mobile unit.

8. The method of determining a position of a mobile unit, as claimed in claim 1, wherein the network has more than three access points, and wherein calculating a two-dimensional position of the mobile unit is determined by a least squares method.

9. The method of determining a position of a mobile unit, as claimed in claim 1, wherein the calculating and storing a physical distance between each one of the reference points and each one of the access points is characterised by the physical distance being calculated by Pythagoras' right angle triangle theorem.

10. The method of determining a position of a mobile unit as claimed in claim 1, further comprising:
   storing the determined coefficients of the polynomial function in the database; and
   wherein the step of calculating a physical distance between the mobile unit and each of the access points further comprises calculating the physical distance based on the received signal strength indicators obtained at the mobile unit and the stored coefficients for each of the access points.

11. A system for determining a position of a mobile unit in communication with a network, the system comprising:
   the mobile unit;
   at least three access points providing radio communication links for the network;
   a database;
   obtaining means adapted to obtain and store in the database location co-ordinates of a plurality of reference points and the access points of the network; to obtain and store in the database access point received signal strength indicators received at each one of the reference points, wherein each of the access point received signal strength indicators provides an indication of the signal strength of a signal sent from one of the access points; and to obtain received signal strength indicators at the mobile unit from the access points;
   determining means adapted to determine coefficients of a polynomial function in the database by curve fitting, wherein the coefficients are representative of a relationship between the stored access point received signal strength indicators and the stored physical distance between the reference points and each one of the access points and wherein the curve is representative of the propagation of the stored access points in an offline mode;
   calculating means adapted to calculate and store in the database a physical distance between each one of the reference points and each one of the access points based on their stored co-ordinates; to calculate a physical distance between the mobile unit and each of the access points based on the received signal strength indicators obtained at the mobile unit and the coefficients for each of the access points; and to calculate a position of the mobile unit based on the calculated physical distances between the mobile unit and each of the access points;
   wherein the determining means is further adapted to process the database storing the received signal strength indicators of the access points and the physical distances between the reference points and the access points, and to output the coefficients.

12. The system, as claimed in claim 11, wherein the network is in an environment comprising sub-regions, and the determining means is further adapted to determine coefficients for each sub-region respectively.

13. The system, as claimed in claim 12, wherein the determining means is further adapted to determine the sub-region wherein the MU is located with a fingerprint positioning method.

14. The system, as claimed in claim 13, wherein the determining means is further adapted to find a Nearest Neighbour using a Distance Method.

15. The system, as claimed in claim 14, wherein the Distance Method is City Block.

16. The system, as claimed in claim 11, wherein in operation the system provides for informing the mobile unit the calculated position thereof.

17. The system, as claimed in claim 11, wherein in operation the system provides for sending a message to the mobile unit, wherein the message is dependent on the calculated position of the mobile unit.

18. The system, as claimed in claim 11, wherein the network has more than three access points, and wherein calculating a two-dimensional position of the mobile unit is determined by a least squares method.

19. A method of determining a position of a mobile unit in communication with a network that has at least three access points, the method comprising:
   obtaining and storing location co-ordinates of a plurality of reference points and access points of the network;
   calculating and storing a physical distance between each one of the reference points and each one of the access points based on their stored co-ordinates;
   obtaining and storing access point received signal strength indicators received at each one of the reference points, wherein each of the access point received signal strength indicators provides an indication of the signal strength of a signal sent from one of the access points;
   determining coefficients of a polynomial function representative of a relationship between the stored access point received signal strength indicators and the stored physical distance between the reference points and each one of the access points;
   obtaining received signal strength indicators at the mobile unit from the access points;
   calculating a physical distance between the mobile unit and each of the access points based on the received signal strength indicators obtained at the mobile unit and the coefficients for each of the access points; and
   calculating a position of the mobile unit based on the calculated physical distances between the mobile unit and each of the access points;
   wherein the network is in an environment comprising sub-regions, and the step of determining coefficients further comprises determining coefficients for each sub-region respectively.

20. The method of determining a position of a mobile unit, as claimed in claim 19, wherein determining coefficients comprises a step of curve fitting, including processing a database storing the received signal strength indicators of the access points and the physical distances between the reference points and the access points, and outputting coefficients that are representative of a relationship between the stored received signal strength indicators and physical distances, wherein the curve is representative of the propagation of the stored access points in an offline mode.

* * * * *